(12) United States Patent
Winter

(10) Patent No.: US 7,653,656 B2
(45) Date of Patent: Jan. 26, 2010

(54) METHOD FOR SPLITTING A DATA STREAM

(75) Inventor: Marco Winter, Hannover (DE)

(73) Assignee: Thomson Licensing, Boulogne Billancourt (FR)

( * ) Notice: Subject to any disclaimer, the term of this patent is extended or adjusted under 35 U.S.C. 154(b) by 284 days.

(21) Appl. No.: 11/133,479

(22) Filed: May 16, 2005

(65) Prior Publication Data

US 2005/0256967 A1 Nov. 17, 2005

(30) Foreign Application Priority Data

May 15, 2004 (DE) .............................. 040 11 609

(51) Int. Cl.
*G06F 17/00* (2006.01)
*G06F 17/30* (2006.01)

(52) U.S. Cl. .................... 707/104.1; 707/200; 725/145; 386/4; 709/231

(58) Field of Classification Search .................. 709/231
See application file for complete search history.

(56) References Cited

U.S. PATENT DOCUMENTS

| | | | |
|---|---|---|---|
| 7,106,946 B1 * | 9/2006 | Kato ............................ | 386/69 |
| 2003/0103604 A1 * | 6/2003 | Kato et al. ..................... | 379/68 |
| 2003/0152036 A1 * | 8/2003 | Brown et al. ................. | 370/252 |
| 2004/0034712 A1 * | 2/2004 | Rajwan et al. .............. | 709/231 |
| 2004/0062516 A1 * | 4/2004 | Takeda et al. ................... | 386/4 |
| 2004/0163116 A1 * | 8/2004 | Taira et al. ..................... | 725/89 |
| 2004/0197084 A1 * | 10/2004 | Tagawa et al. ................ | 386/95 |
| 2004/0210948 A1 * | 10/2004 | Jin et al. ...................... | 725/145 |
| 2005/0036519 A1 * | 2/2005 | Balakrishnan et al. ....... | 370/503 |
| 2005/0198115 A1 * | 9/2005 | Sugimoto et al. ........... | 709/203 |
| 2006/0110111 A1 * | 5/2006 | Van Gestel et al. ............ | 385/95 |

OTHER PUBLICATIONS

Patent Abstract of Japan patent JP 10032826, Feb. 3, 1998, Oki Electric Ind Co Ltd.
Search report dated Sep. 23, 2004.

* cited by examiner

*Primary Examiner*—Pierre M Vital
*Assistant Examiner*—Loan T Nguyen
(74) *Attorney, Agent, or Firm*—Robert D. Shedd; Joseph J. Opalach; Reitseng Lin

(57) ABSTRACT

In the DVR or Blu-ray application format, a clip consists of a clip information file, through which it can be accessed from playlists, and an audio-visual data stream file. The data stream includes data units, which in turn include multiple source packets. When such stream shall be split between source packets into two substreams, and the splitting position is within such a data unit, the employed file system may not allow splitting single data units. According to the invention, the smallest possible data unit that includes the intended splitting position is declared as a separate tile, having separate clip information and data stream files. The first and second substreams are accessible via one or more RealPlaylists and/ or VirtualPlaylists. The first substream comprises data from the first and second clips, and the second substream comprises data from the second and third clips.

14 Claims, 5 Drawing Sheets

METHOD FOR SPLITTING A DATA STREAM

This application claims the benefit, under 35 U.S.C. §119 of European 04011609.7, filed May 15, 2004.

FIELD OF THE INVENTION

This invention relates to a method for splitting a data stream. In particular, the invention relates to a method for splitting a data stream under a file system that allows only packet-wise access to streaming data.

BACKGROUND OF THE INVENTION

Optical discs are commonly used as storage media for audio-visual (AV) data. These discs are divided into logical units, usually sectors, where data portions are stored. Further, various file systems are available for the organization of the data storage on discs. These file systems can be classified in two types: while in one file system type any data byte position is randomly accessible, the other type of file systems can only access specified data units, e.g. sectors. The latter is the case e.g. for the Universal Disk Format (UDF) specified by the Optical Storage Technology Association (OSTA) at the OSTA website associated with osta.org. File systems generally define e.g. which data units belong to a file. E.g. UDF uses so-called "file entries" for this purpose.

When video data are recorded on an optical disc, e.g. a Digital Versatile Disc (DVD) or Rewritable Blu-ray disc (BD-RE), a hierarchical logical structure is used for the organization of the data. This structure comprises a playlist stored in a playlist file, containing references to clip information files that in turn describe video sequences, also known as clips. The clips contain the actual AV data files. When AV data shall be edited that are recorded on a rewritable optical medium, the editing process usually includes splitting of files. But when a video recording shall be split, the splitting position may be within the smallest accessible data unit, e.g. a sector. In this case, splitting is difficult with a file system that can only access full sectors.

Editing of video data stored on a BD-RE is described e.g. in FIG. 3.1.5.4 of part 3 of the BD-RE description that is available from the official Blu-ray website associated with bluravdisc-official. org. It uses the dividing and combining of playlists and newly generated virtual playlists. But it assumes that dividing and combining can be performed at any position within a clip. This is not possible when e.g. UDF is used as file system on the disc.

SUMMARY OF THE INVENTION

The problem to be solved by the present invention is to provide a method for splitting a data stream, e.g. video data stream, which may comprise one or more files, wherein the splitting position may be arbitrary. Particularly, the splitting position may be within the smallest accessible data unit, e.g. on an optical disc or hard-disc (HDD).

This problem is solved by the invention as disclosed in claim 1. The inventive method comprises identifying the smallest data unit that includes the intended splitting position and that can be converted to a separate file, splitting the stream before and after said data unit, thus declaring this data unit (and potentially few neighboring data units) as a separate first file, declaring the preceding stream data as a second file and the subsequent stream data as a third file, and referencing the first substream through the first and second files, and the second substream through the first and third files.

A file may be understood as a data unit that is physically freely accessible within a file system (not taking into account higher layer restrictions, e.g. through security, access right or content protection mechanisms), and that is capable of storing a portion of a data stream. A data stream may be understood as a steady and continuous sequence of interrelated data, and can be distributed to one or more files.

In particular, the inventive method for splitting a data stream, the data stream comprising one or more files, into a first and a second substream, wherein a file system is employed for defining which data units belong to a file, includes the steps of detecting the smallest data unit that includes the intended splitting position and that can be stored as a separate file, generating from said separated data unit or few data units including said separated data unit a first file, generating from the preceding and the subsequent stream data separate second and third files, and referencing the first substream through the first and second files, and the second substream through the first and third files. The splitting position may be within the smallest data unit that is accessible via the file system.

In principle, the method can be extended to split a data stream into k substreams simultaneously, with k being any integer number, wherein 2k-1 files are generated.

A device for splitting a multimedia data stream is disclosed in claim 10.

The device for splitting a multimedia data stream into a first and a second substream includes means for receiving a splitting position, wherein the splitting position may be within the smallest accessible data unit provided by the application format under the used file system, means for converting the smallest accessible data unit that contains data of both partial data streams, and optionally also few neighboring data units, into a separate first file, and means for converting remaining data units that fully belong to the first partial data stream into a second file and remaining data units that fully belong to the second partial data stream into a third file.

Advantageous embodiments of the invention are disclosed in the dependent claims, the following description and the figures.

BRIEF DESCRIPTION OF THE DRAWINGS

Exemplary embodiments of the invention are described with reference to the accompanying drawings, which show in FIG. 1 depicts the hierarchical data structure of a video stream.

DETAILED DESCRIPTION OF THE INVENTION

Figure 1:
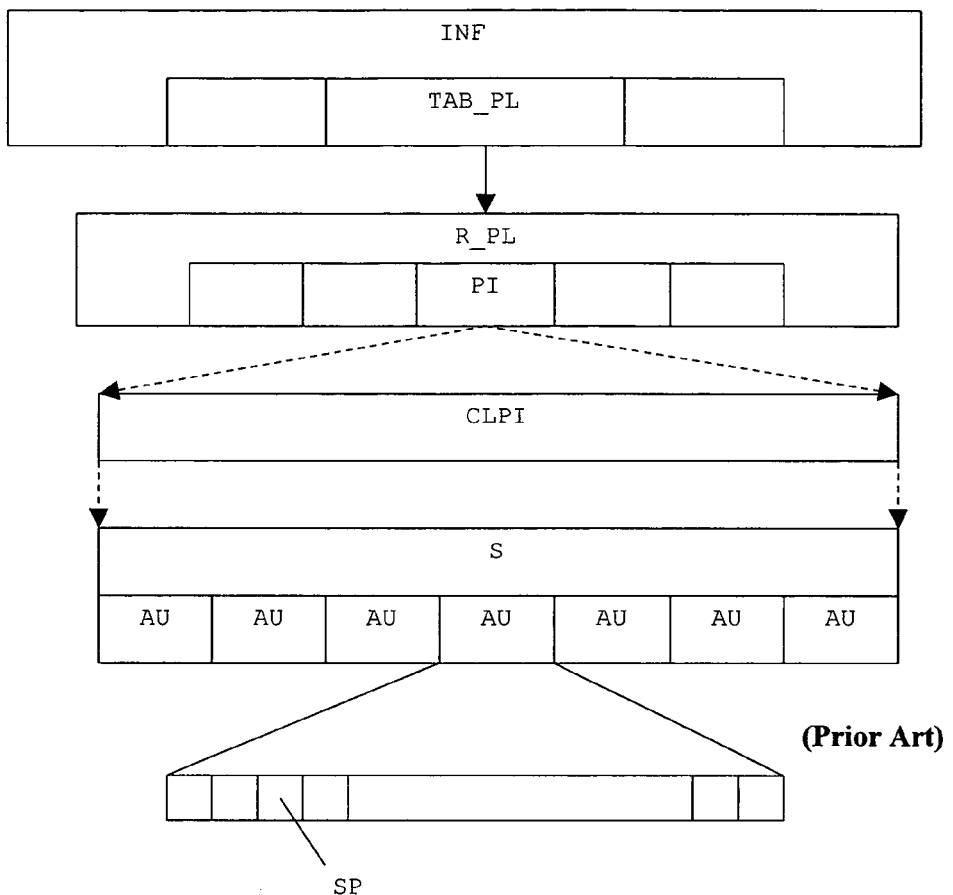

FIG. 1 shows in a simplified manner the layer structure for video data recorded on a recordable optical disc, e.g. DVD or BD-RE, according e.g. to the DVR (Digital Video Recording)

application format. An information area INF contains a table of playlists TAB_PL, wherein each table entry points to a playlist R_PL stored on the medium. Playlists are references to clips. Clips contain the links to the actual stream files, which contain the actual audio and/or video data.

There are two types of playlists: RealPlaylists R_PL and VirtualPlaylists. RealPlaylists are created automatically when data are recorded, while VirtualPlaylists are optional and additional alternatives. Each clip is referenced at least by one RealPlaylist, but a single RealPlaylist may reference multiple clips. Playlists refer to a single clip, or part of it, as a PlayItem PI. A clip consists of the actual audio-visual (AV) data stream S and an associated clip information file CLPI. The association is done via filenames, i.e. clip information file and related AV stream file have same names, though they have different file name extensions and may be stored in different directories. E.g. a clip information file stored as AV/CLIP-INF/zzzzA.clpi (where zzzzA is e.g. any five-digit numeral) refers to an AV stream in AV/STREAM/zzzzA.m2ts, which generally consists of source packets SP, e.g. MPEG-2 transport stream packets. The clip information file CLPI contains references to timestamps within the source packets SP of the AV data stream S.

The AV data stream S is structured into data units. E.g. in the DVR application format these are called Aligned Units (AU). Each Aligned Unit consists of 3 sectors, which may hold 32 source packets with 192 bytes each. Each source packet contains a timestamp, so that the clip information file can access individual source packets.

Figure 2:
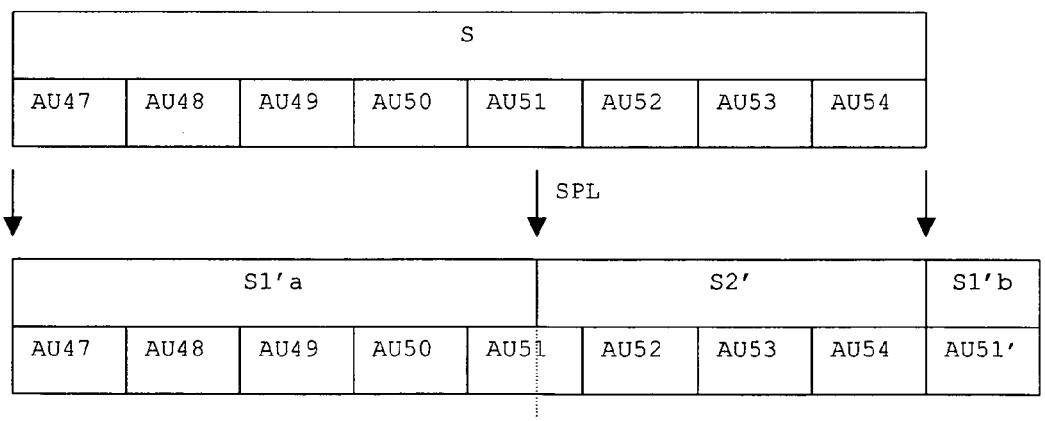
FIG. 2 depicts the splitting of a data stream into first and second substreams, using a copy of a common data unit.

When a user wants to split the AV data stream S into two partial streams S1',S2', as shown in FIG. 2, the exact split position SPL is given by the video encoding format, e.g. between full video frames, and therefore between source packets. Thus, the split position SPL may be located somewhere within a data unit AU51, which would then belong to both partial streams. The earlier intended file system for Blu-ray, BDFS, is able to handle such a case, i.e. a file may start and/or end somewhere within an access unit. This however is not supported by file systems like UDF and most other existing file systems like NTFS and MS-DOS. A simple solution for these file systems that do not support files starting and/or ending within access units would be to copy the respective data unit AU51 to another position AU51' and build a first stream S1' e.g. from the preceding units AU47, . . . , AU50 and the copy AU51', and build a second stream S2' from the original unit AU51 and the successive units AU52, . . . , AU54. The application, e.g. AV reproduction software, is assumed to ignore the non-relevant part of the common data unit AU51, AU51' for the first and the second streams. This solution has the disadvantages that AV data must be copied, and that during playback the pick-up must jump to the new position AU51'.

Figure 3:
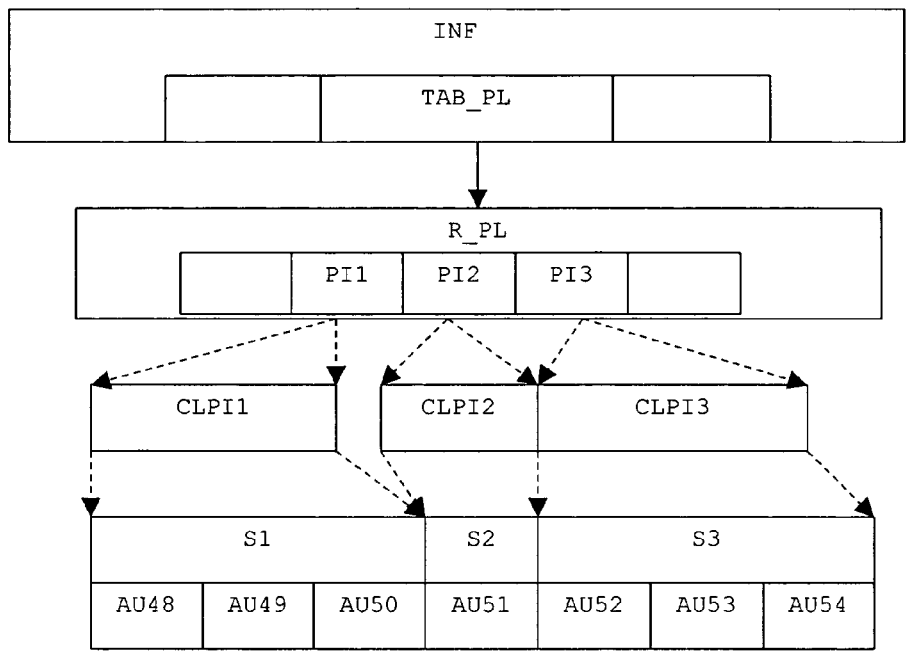
FIG. 3 depicts the splitting of a data stream, using a single RealPlaylist.

According to the invention, the data unit AU51 that belongs to both data streams is declared as an individually accessible separate data unit, e.g. a clip or a file, as shown in FIG. 3. Therefore the data stream is split into three parts S1,S2,S3, wherein one part S1 belongs to the first stream, one part S3 belongs to the second stream and one part S2 belongs to both streams. In order to make each of the fractions separately accessible through the file system, they are converted into separate clips, or files respectively. This can be achieved by splitting the clip information file into three separate clip information files CLPI1,CLPI2,CLPI3 corresponding to the AV stream fractions. Then these new clips are used to compose new playlists.

The invention comprises adapting the hierarchical data structure defined by the application format to the modified allocation of streaming data sectors. Therefore, when a streaming data file shall be split into two fractions or sub-streams, the original clip information file, e.g. zzzzz.clpi with zzzzz being e.g. any numerals, is divided into three clip information files with names corresponding to the fractions that are now new streaming data files, e.g. zzzzA.clpi for zzzzA.m2ts, zzzzB.clpi for zzzzB.m2ts and zzzzC.clpi for zzzzC.m2ts, with A,B,C being different numerals here. Furthermore, the playlist files are automatically adapted so that they can address the new clip information files correctly, which can be done in various ways as described in the following.

In a first embodiment of the invention, separate single RealPlaylists are created that are each associated with one of the three clip information files or clips, i.e. three RealPlaylists are generated. This can be achieved e.g. by splitting the existing RealPlaylist of the complete stream, copying the relevant data to the new RealPlaylist and adding necessary data, such as file headers. Then each clip can be accessed individually, and the different clips can be combined using VirtualPlaylists. The original RealPlaylist of the complete stream can then be deleted. Copying of Playlist files is much quicker than copying of AV data files, since Playlist files contain considerably less data.

In a second embodiment of the invention there are only two RealPlaylists generated for the two fractions of the stream, wherein each RealPlaylist is associated with at least two clip information files: one for the data unit that belongs to both streams, and at least one for the data units that belong only to the respective data stream. Then both stream fractions can be accessed individually through their respective RealPlaylists, and the stream fractions can be combined using VirtualPlaylists. Furthermore, a VirtualPlaylist can also access single clips.

In a third embodiment of the invention the three new clips are accessible via a single RealPlaylist, similar to the 'combine-operation' shown in the right-hand part of FIG.3.1.5.4 (3) of the above-mentioned BD description, where only two clips are combined. Two VirtualPlaylists can then be used to describe the first and second partial data stream by accessing the respective clips as PlayItems.

The above-described basic embodiments can be combined, as described in the following.

In one embodiment of the invention, shown in FIG. 3, the resulting clips CLPI1,CLPI2,CLPI3 are accessible as PlayItems PI1,PI2,PI3 of a single RealPlaylist R_PL. With this structure, it is possible e.g. to delete AV data that represent only a part of a data unit AU51, because the clip information file CLPI2 can address single source packets within the data unit AU51 via their timestamps.

Figure 4:
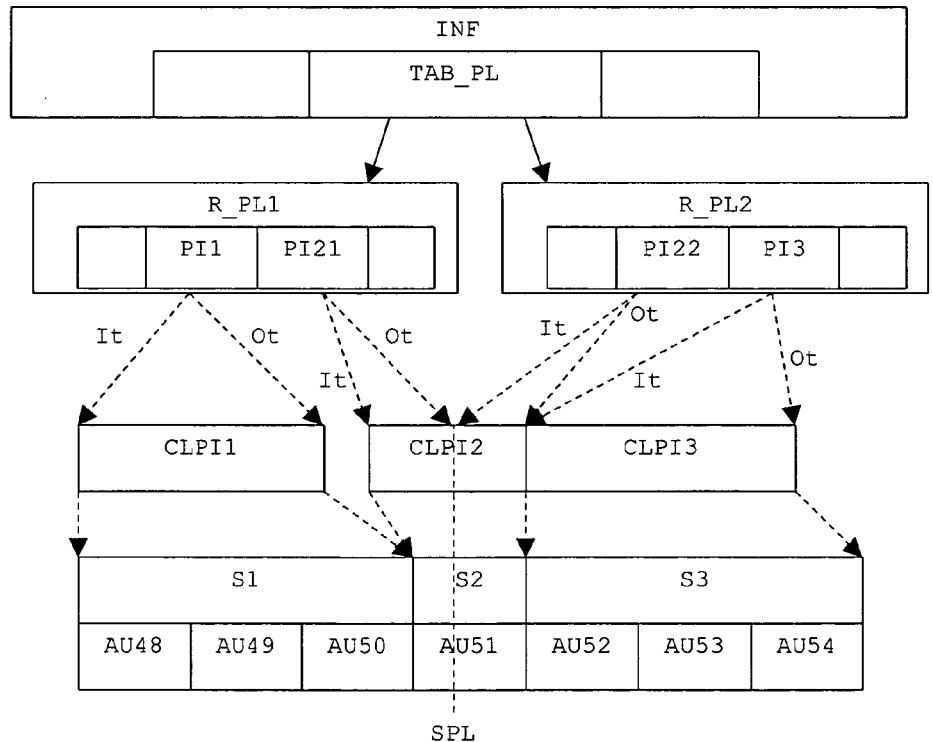
FIG. 4 depicts the splitting of a data stream, using two separate RealPlaylists.

In another embodiment of the invention, shown in FIG. 4, two separate RealPlaylists R_PL1,R_PL2 are generated, so that two independent streams exist. The first RealPlaylist R_PL1 contains PlayItems PI1,PI21 that point to the first clip CLPI1 and the first part of the second clip CLPI2 and their corresponding AV data S1,S2. The second RealPlaylist R_PL2 contains PlayItems PI22,PI3 that point to the second part of the second clip CLPI2 and the third clip CLPI3 and their corresponding AV data S2,S3. This is possible when a playlist can specify a position within a clip, i.e. within a clip information file and thus the corresponding stream, e.g. through a timestamp. In some applications, like e.g. DVR, playlists can specify IN_time It and OUT_time Ot as the beginning and end of a part of a clip. OUT_time of the first part of the second clip and IN_time of the second part of the same clip may be identical, namely the splitting position SPL. Thus, it is possible that a single smallest data unit that an application format provides may contain data that belong to different streams, which is advantageous e.g. when video streams are edited and split, because copying of AV data and additional pick-up jumps during playback are avoided.

During playback of a substream, a split access unit is read completely, but only those data that are referenced in the playlist, and thus belong to the substream, are used. The other data that are contained in the split access unit are ignored.

According to the above-mentioned BD description, the file names and directories in FIG. 4 may on a BD using the DVR application format be BDAV/info.bdav for the management information for the parent directory INF, xxxxA.rpls and xxxxB.rpls in BDAV/PLAYLIST/ for the RealPlaylists R_PL1,R_PL2, zzzzA.clpi, zzzzB.clpi and zzzzc.clpi in BDAV/CLPINF/ for the clip information files CLPI1,CLPI2,CLPI3, and zzzzA.m2ts, zzzzB.m2ts and zzzzC.m2ts in BDAV/STREAM/ for the AV stream data files S1,S2,S3.

A device for splitting a data stream stored e.g. in the DVR application format into a first and a second partial data stream contains means for receiving a splitting position, e.g. via user input, wherein the splitting position may be within the smallest accessible data unit provided by the application format under the used file system, so that one of the smallest accessible data units contains data belonging to both partial streams, means for converting contiguous data units including the smallest accessible data unit that contains data of both partial data streams into a separate first file, and means for converting remaining data units that fully belong to the first or the second partial data stream into separate second and third files respectively.

Figure 5:
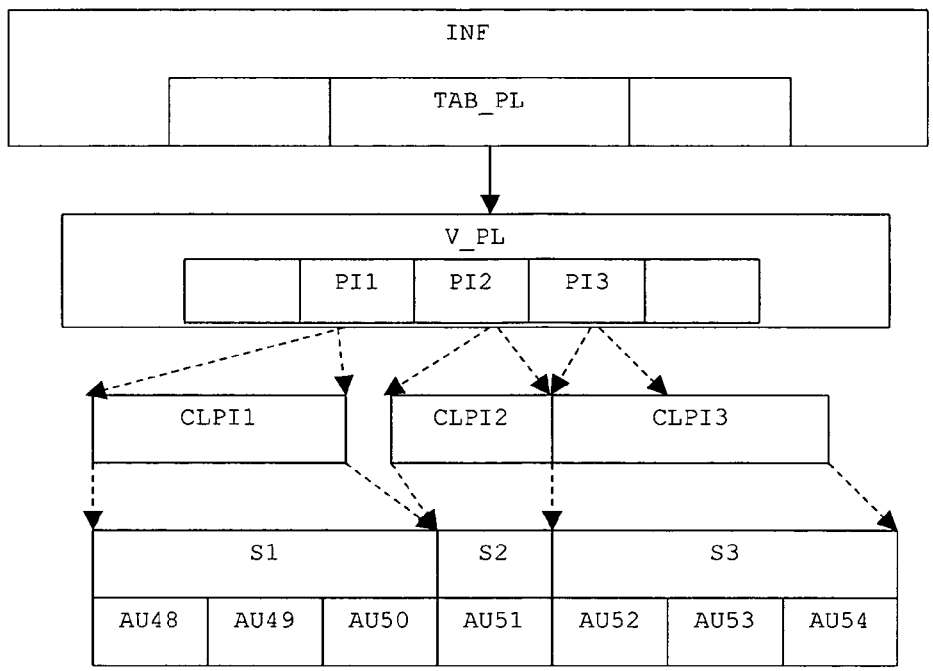
FIG. 5 depicts the splitting of a data stream, using a single VirtualPlaylist.
Figure 6:
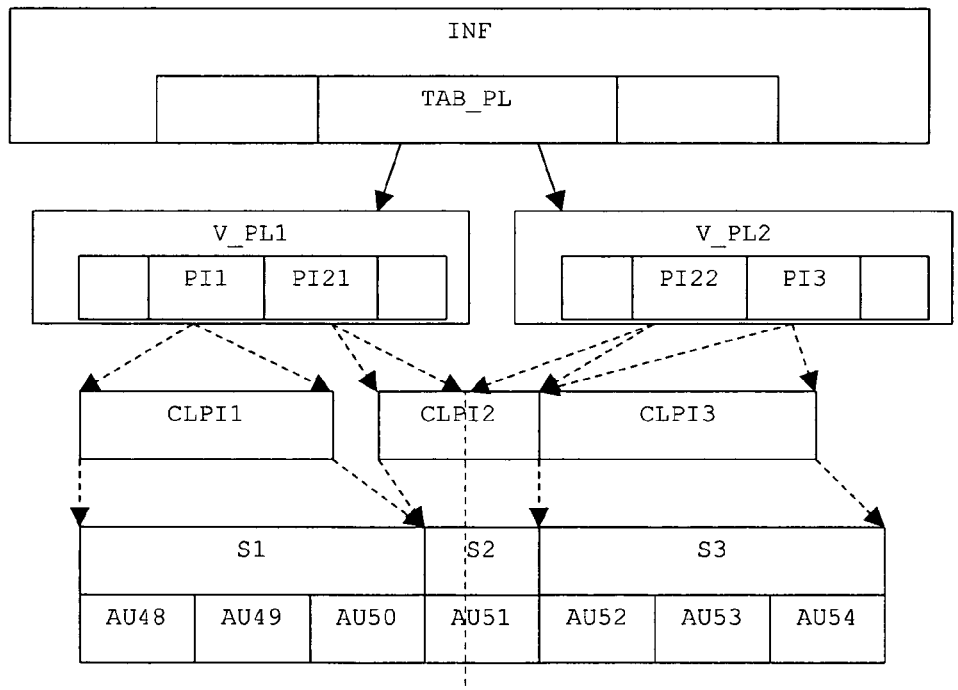
FIG. 6 depicts the splitting of a data stream, using two separate VirtualPlaylists.

FIG. 5 and FIG. 6 show further embodiments that are in principle similar to the embodiments of FIG. 3 and FIG. 4, except that VirtualPlaylists V_PL,V_PL1,V_PL2 are used instead of RealPlaylists. The effect is that the streams may be separately accessible, since they may have separate RealPlaylists as in FIG. 4, but the user can append them to a single presentation again by using a VirtualPlaylist V_PL that contains PlayItems PI1,PI2,PI3 referencing all three clips. Further, as shown in FIG. 6, VirtualPlaylists can like RealPlaylists specify positions within clips through timestamps of respective packets.

Figure 7:
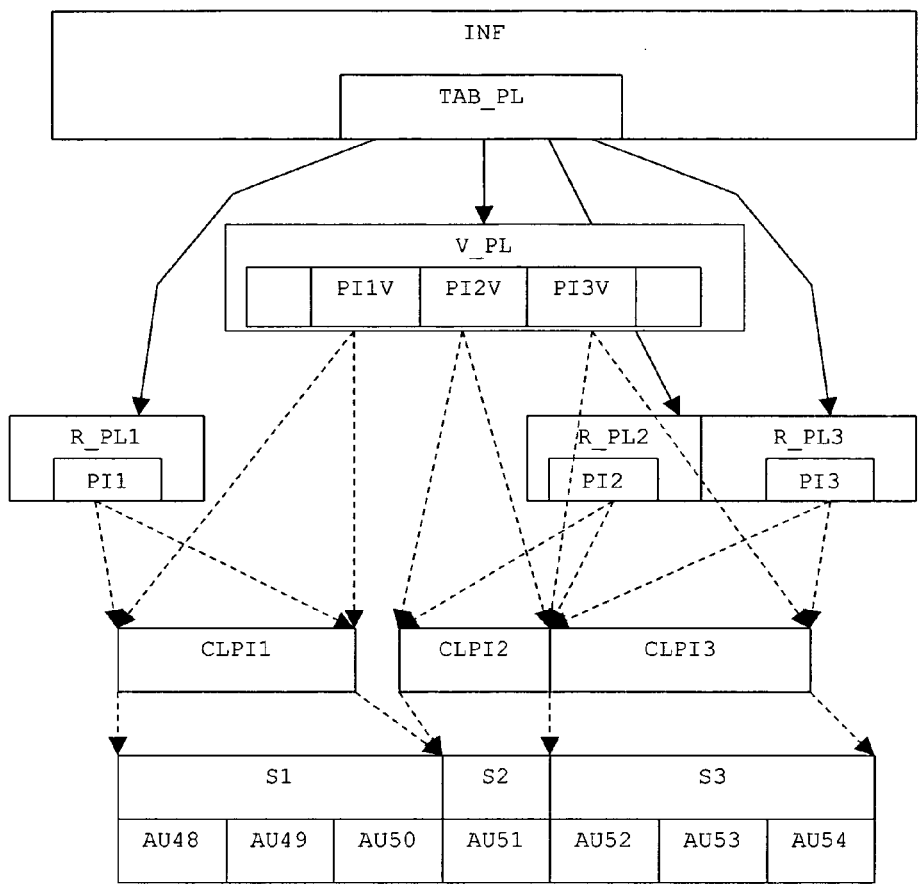
FIG. 7 depicts the splitting of a data stream, using three separate RealPlaylists and a single VirtualPlaylist.

An example for using VirtualPlaylists and RealPlaylists is depicted in FIG. 7. The table of playlists TAB_PL contains references to a VirtualPlaylist V_PL as well as references to RealPlaylists R_PL1,R_PL2,R_PL3, and the user can select each of them directly. The VirtualPlaylist refers to the original whole stream, as it was before splitting.

As an advantage of the invention, it is possible to split AV streams without having to copy AV data, and thus without having to accept time-consuming pick-up jumps due to stream fractions being distributed over distant sectors of the disc.

Another advantage of the invention is that it is compliant to all relevant standards, e.g. those mentioned above.

If the splitting location is at the immediate beginning or end of the access unit, then there is no need to split the stream into three parts. In this case, the trivial solution may be applied, i.e. the stream is simply separated into two parts only.

Further, the inventive method and apparatus can be adapted to different situations by combining RealPlaylists and VirtualPlaylists accordingly.

Moreover, with the inventive method it is possible to split a stored data stream simultaneously into any number of fractions at any position. Assuming that splitting positions do not coincide with borders of sectors or access units, the splitting of a data stream into k substreams will result in 2k-1 files when the inventive method is used. If a splitting position is at the beginning or end of a sector or access unit, the splitting can be performed conventionally, and the sector or access unit needs not be converted into a separate file, so that the number of files is lower. A device according to the invention may therefore also contain means for detecting if the splitting position is within such smallest accessible data unit.

It should be noted that the file which includes the AV data unit with the splitting position may also include further AV data units, i.e. it needs not necessarily be restricted to the smallest possible amount of data around the actual splitting position. However, in a preferred embodiment this file is as small as possible, since in that case it contains the minimum amount of data to be ignored during playback.

Figure 8:
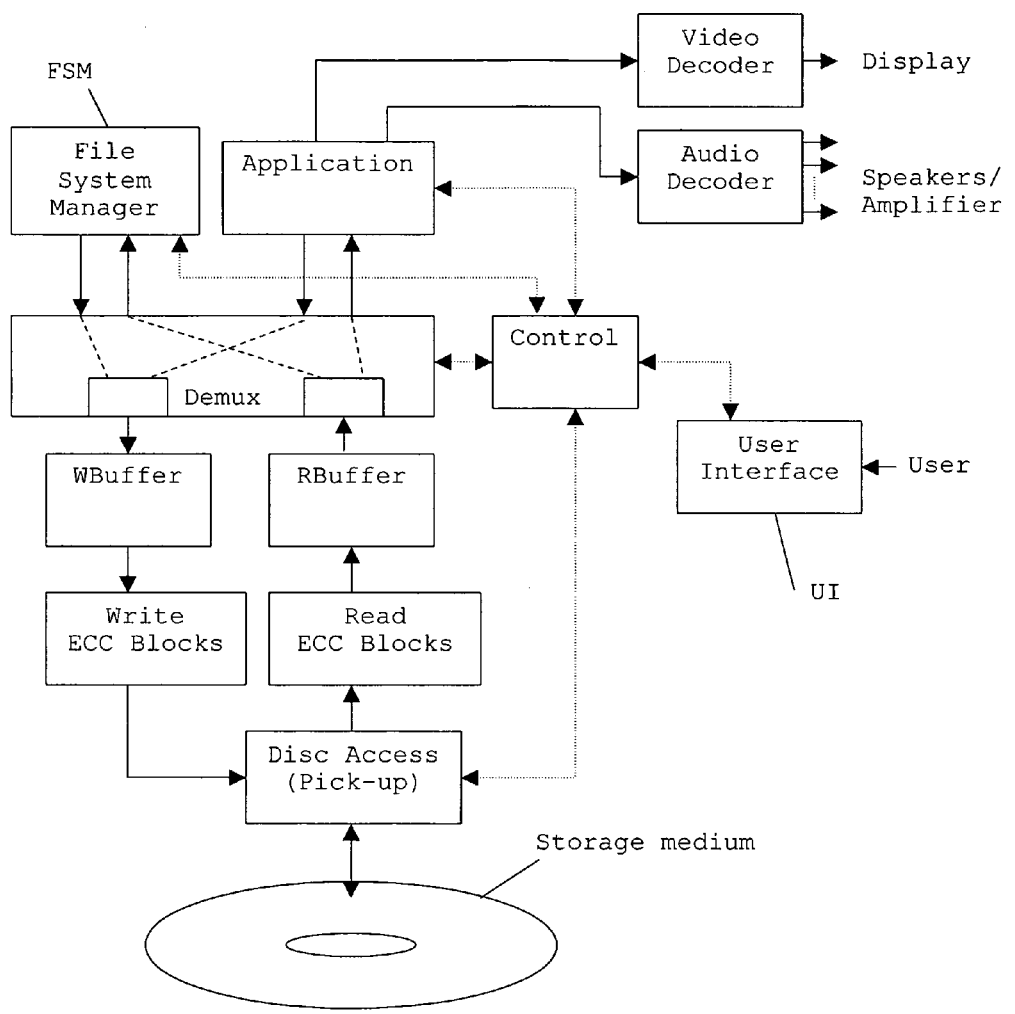
FIG. 8 shows an apparatus suitable for splitting a data stream according to the invention.

An exemplary apparatus according to the invention is shown in FIG. 8. A pick-up reads data with the above-described structure from a rewritable storage medium, e.g. disc. Data integrity is secured by analysis of error correction code (ECC) blocks, and correctable errors are corrected. Then the data are buffered in a read buffer. While for playback, e.g. control output for editing, the data are delivered to a corresponding application that provides compressed AV data to audio and/or video decoders, an editing process requires data to be re-organized or re-labeled by a file system manager. A demultiplexing unit performs the distribution of the data, controlled by a control unit.

User input is received via a user interface and is used to move the pick-up to the required position. The stream to be split is read by the pick-up, checked for errors, which are possibly corrected, buffered in a read buffer, and directed through a demultiplexer to the file system manager.

The control unit detects for the user-requested splitting position the nearest possible actual splitting position, which depends on the used application and may be e.g. a packet border. Then the control unit communicates the actual splitting position to the file system manager, which determines a preferably small region around said position to be declared as a separate file, and further converts this region as well as the preceding and the subsequent parts of the stream into three separate files. For this purpose, the file system manager also generates or modifies other files in the application specific data structure, e.g. the clip information files, as described above. The modified data are then in the usual way written back to the storage medium, using a write buffer and error correction coding.

The invention is usable for various application formats. In principle, the invention is applicable to all stream recording formats, where streams are stored as separate files that can be accessed via playlists or similar structures, e.g. 'program chains', and the accessible units of the applications may start or end within an accessible unit of the underlying file system, e.g. DVD Video Recording (DVD-VR) data on an MS-DOS partition (e.g. 4 kB cluster of a FAT16 partition).

What is claimed is:

1. A method for splitting a stored data stream, the data stream comprising one or more files, into a first substream and a second substream, wherein a file system is employed for defining which one or more data units of a physical storage belong to a file, the method comprising the steps of:

detecting within the stored data stream a data unit of the physical storage that includes an intended splitting position;

generating a separate first file, the first file including said data unit of the physical storage including the intended splitting position;

generating separate second and third files, wherein the second file contains the stream data preceding the stream data of the first file and the third file contains the stream data subsequent to the stream data of the first file, and wherein, during said generating of the first, second, and third files, the respective control information is modified and the respective stored audio-visual information is not copied; and referencing the first substream through the first and second files and referencing the second substream through the first and third files, wherein said data unit of the first file is a part of each of the first substream and the second substream.

2. The method according to claim 1, wherein the separate first file includes only said data unit of said physical storage.

3. The method according to claim 1, wherein generating the first, the second and the third files comprises generating corresponding first, second and third clip information files, and wherein each said referencing through selected ones of the first, second and third files comprises referencing the corresponding clip information files.

4. The method according to claim 3, wherein each clip information file is referenced fully or partially through at least one playlist.

5. The method according to claim 3, wherein the substreams include source packets that include time stamps, and the links within the clip information files are references to said time stamps.

6. The method according to claim 4, wherein three separate playlists are automatically generated for the three clip information files.

7. The method according to claim 4, wherein two separate playlists are generated, the first playlist referencing the first and second clip information files and the second playlist referencing the first and the third clip information files.

8. The method according to claim 7, wherein the two generated playlists are virtual playlists.

9. The method according to claim 1, wherein the substreams include source packets, and the splitting position is between stored source packets.

10. A device for splitting a multimedia data stream stored on a storage device into a first substream and a second substream, wherein a file system is employed for defining which one or more data units of a physical storage belong to a file, the device comprising:

interface means for receiving a splitting position, wherein the splitting position is within a data unit of the physical storage;

means for generating, based at least in part on a first control file, a first file comprising the data unit of the physical storage that contains said splitting position; and means for generating a second file and a third file, wherein the second file includes the stream data preceding the stream data of the first file and the third file includes the stream data subsequent to the stream data of the first file, and wherein, during said generating of the first, second, and third files, the respective control information is modified and the respective stored audio-visual information is not copied; and means for referencing the first substream through the first and second files, and for referencing the second substream through the first and third files, wherein said data unit of the physical storage of the first file is a part of each of the first and the second substream.

11. The device according to claim 10, wherein the first file includes only the data unit of the physical storage that contains said splitting position.

12. The device according to claim 10, wherein the first file generating means and the second and third file generating means generate corresponding first, second and third clip information files, wherein said first, second and third files are referenced through the corresponding clip information files.

13. The method according to claim 1, wherein the separate first file further includes at least one neighboring data unit of the data unit that includes the intended splitting position.

14. The device according to claim 10, wherein the first file further includes at least one neighboring data unit of the data unit that includes the splitting position.

* * * * *